UNITED STATES PATENT OFFICE.

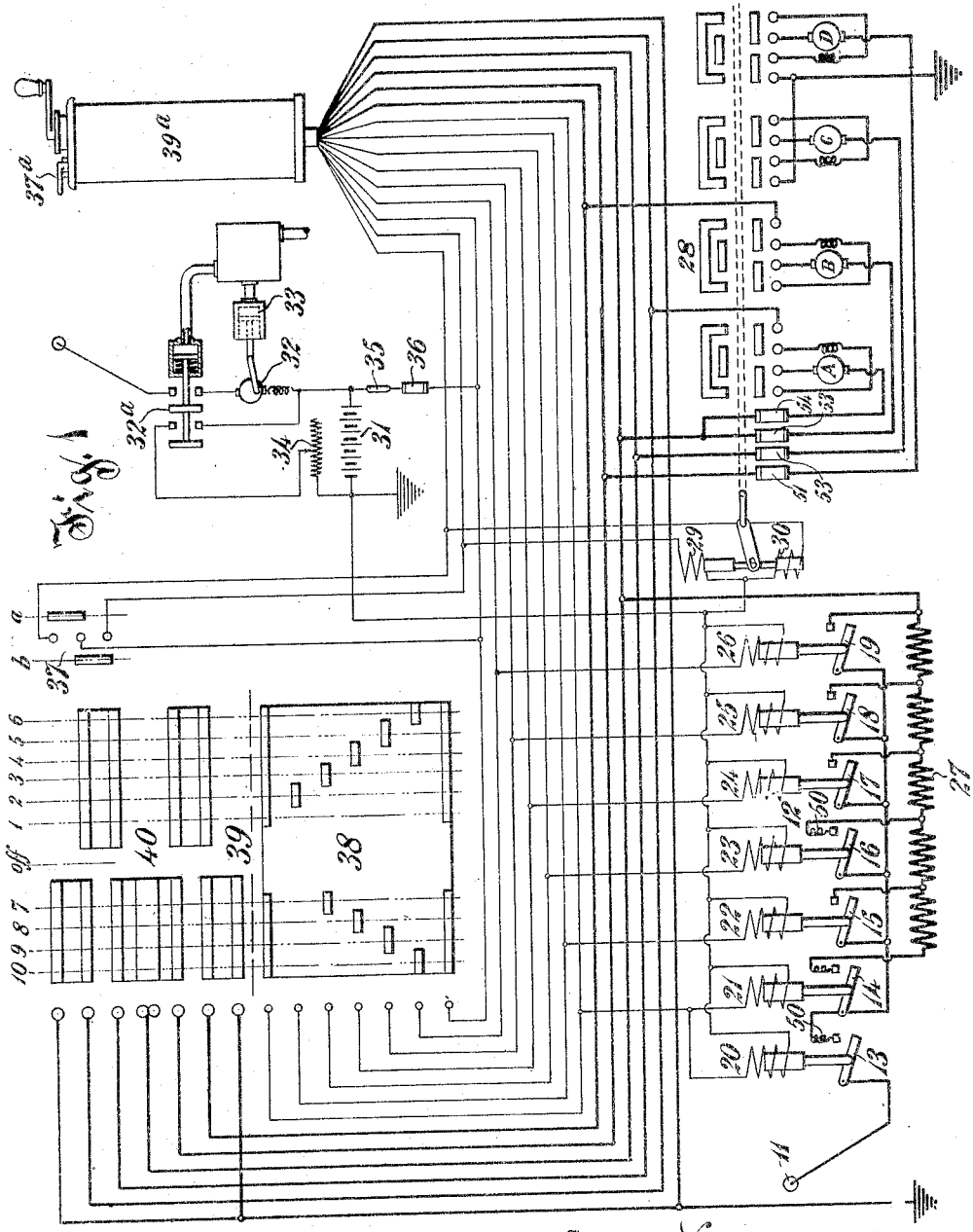

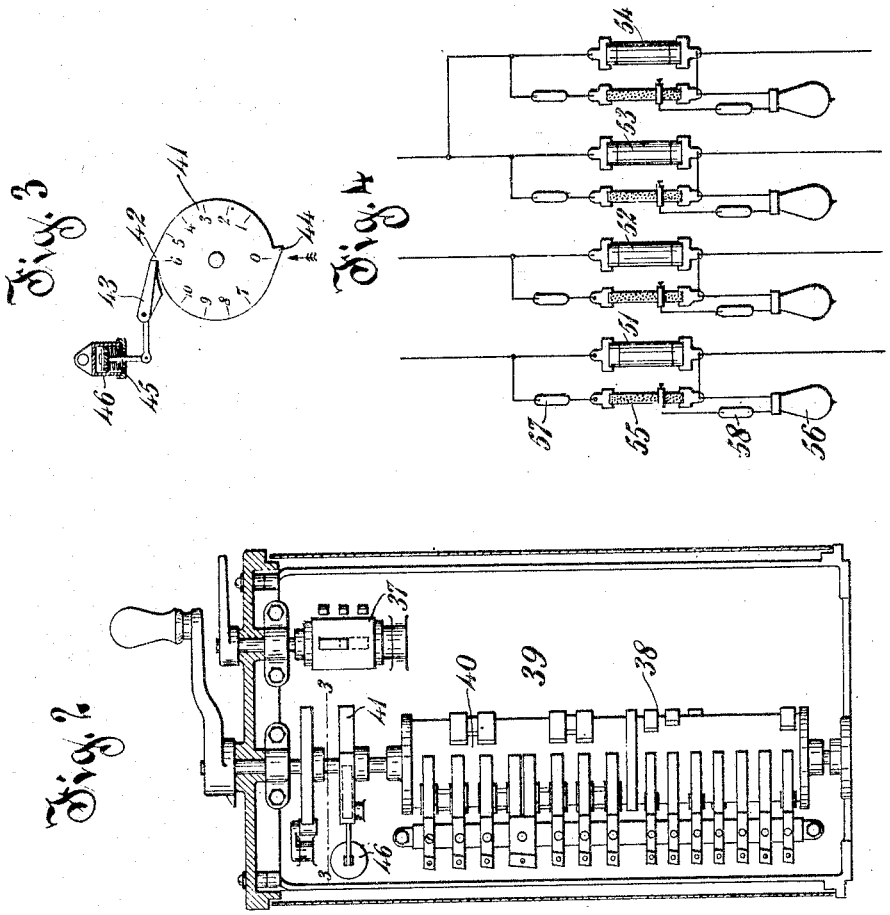

EMMETT W. STULL, OF NORWOOD, OHIO, ASSIGNOR TO ALLIS-CHALMERS COMPANY, A CORPORATION OF NEW JERSEY.

MOTOR-CONTROL SYSTEM.

949,097.  Specification of Letters Patent.  Patented Feb. 15, 1910.

Application filed April 1, 1908. Serial No. 424,549.

*To all whom it may concern:*

Be it known that I, EMMETT W. STULL, citizen of the United States, residing at Norwood, in the county of Hamilton and State of Ohio, have invented certain new and useful Improvements in Motor-Control Systems, of which the following is a full, clear, and exact specification.

My invention relates to motor control systems, and particularly to remote control systems as used for electric railways.

In the modern development of electric railways there has been in some quarters a marked tendency toward the use of remote control systems. This tendency is largely due to the desire to avoid the making and breaking on the car platform of circuits carrying the heavy currents of modern electric vehicles. A number of these remote control systems have been developed, and in these there has generally been a main controller which connects the motors to be controlled in various relations and generally varies the resistance in the motor circuit, and a master controller which controls the operation of the main controller. With such arrangements there have been considerable trouble and much complication on account of the switch or switches of the main controller which controls the series and parallel connections of the motors.

It is the object of my invention to avoid this trouble, to simplify the construction of the main controller, and to improve the operation of the system as a whole, while still retaining all the advantages of other remote control systems.

With this object in view, my invention somewhat broadly comprises the combination of a plurality of motors, a controller for said motors, a master controller for said first mentioned controller, and means operated with said master controller for connecting said motors in various inter-relations. In the particular embodiment of my invention which is hereinafter described, motors are connected in series and in parallel.

The various novel features of my invention will appear from the description and drawings and will be particularly pointed out in the claims.

Figure 1 is a diagram showing the connections of a system arranged in accordance with my invention; Fig. 2 is an elevation of the combined series-parallel switch and master controller, the controller casing being in section. Fig. 3 is a section on the line 3—3 of Fig. 2; and Fig. 4 is a diagram showing a preferred arrangement of telltale lights for indicating the blowing of a fuse.

In the arrangement shown there are four motors, A, B, C, and D, and these are supplied with current from a trolley 11 or other suitable collecting device. The resistance controller 12 for these motors comprises a plurality of switches 13 to 19 inclusive, operated by solenoids 20 to 26 inclusive respectively. The switch 13 is the main or circuit-closing switch, while the switches 14 to 19 inclusive control the cutting in or out of sections of the resistance 27. To complete the motor circuit, the switch 13 and one of the switches 14 to 19 inclusive must be closed. The main reversing switch 28, which may be of any desired or usual construction and needs no explanation herein, is movable into its two positions by solenoids 29 and 30 respectively.

The solenoids 20 to 26 inclusive and 29 and 30 are supplied with current from any desired source, such as a battery 31, which, if a secondary battery, may be arranged to be intermittently charged by being connected in series with the driving motor 32 of the air compressor 33 of the air brake system. The charging of the battery 31 may be regulated by a variable resistance 34 arranged to be connected in shunt to the battery when pressure switch 32$^a$ is closed and the motor 32 is running. One side of this battery, preferably the side toward the trolley, is connected to the controlling circuits through a switch 35 and a fuse 36.

The actuating solenoids 29 and 30 of the main reversing switch are controlled by a master reversing switch 37, connected as shown. The actuating solenoids, 20 to 26 inclusive of the resistance controller are controlled by the lower part 38 of the drum controller 39. The upper part 40 of this drum controller 39 is arranged directly to connect the motors A and B in series or in parallel with the motors C and D respectively. Thus, the drum controller 37 is a combined series-parallel switch and master controller, and the part 40 and the resistance controller 12 together form the main or motor controller. Any desired interlocking mechanism may be provided between the master reversing switch and the master controller.

The combined series-parallel switch and master controller 39 is arranged with its series positions on one side of its off position and its parallel positions on the other side thereof. As shown there are six series positions and four parallel positions, there being fewer parallel positions because it is usually not necessary to connect in the whole resistance in the parallel positions. In moving the controller 39 from the off position to either the series or parallel side, the upper part 40 thereof is arranged to make its connections before the lower part 38 does, thus insuring the proper series or parallel connection of the main motors before the circuit is closed at the main controller.

In order to prevent the combined series-parallel switch and master controller 39 from being moved from the off position directly to the parallel positions without first being moved to the series positions, a toothed disk 41 is mounted on the shaft of such controller with its tooth 42 normally in engagement with a lever 43 to lock the controller against movement from the off position to the parallel positions. However, when the controller 39 has been moved to the last series position, position 6, the cam 44 on the disk 41 raises the lever 43 out of the path of the tooth 42, thereby compressing the spring 45, and thus permits the controller 39, if moved quickly, to be moved from the last series position through the off position to the parallel positions. A dash pot 46 is provided to prevent the spring 45 from moving the lever 43 too quickly back into the path of the tooth 42 after it has been moved out of such path.

The operation of the system is substantially as follows. The reversing switch 28 is set by proper movement of the master reversing switch to energize the solenoid 29 or 30. After the reversing switch 28 has been set as desired, the controller 39 is moved in a clockwise direction (Fig. 3) into position 1, in such movement first connecting the motors A and B in series respectively with the motors C and D and then completing the circuit from the battery 31 to the solenoids 20 and 21. The latter immediately close their associated switches 13 and 14, thus completing the motor circuit through the whole resistance 27. As the controller 39 is moved forward to positions 2, 3, 4, 5, and 6, the solenoids 22, 23, 24, 25, and 26 are successively energized to close their associated switches, thus gradually cutting the resistance 27 out of circuit. The part 38 of the controller 39 may be arranged either to interrupt or to maintain closed the circuits of each solenoid 22 to 25 inclusive as it is moved forward to complete the circuit of the solenoid next to the right thereof. With the controller 39 in position 6, the final series position, the cam 44 has raised the lever 43 out of the path of the tooth 42 of the disk 41. By a comparatively rapid movement the controller 39 is now moved from position 6 through the off position to the first parallel position, position 7, the tooth 42 clearing the lever 41 in this movement. Electrically, this movement causes the following actions in sequence: The resistance 27 is again cut into circuit either gradually or suddenly, according as the switches 15 to 18 inclusive are closed or open when the controller 39 in its movement toward off position passes beyond the position in which such switches are respectively caused to be raised; the motor circuit is broken by the practically simultaneous opening of the switches 13 and 14, which divide any arc which may be formed; the series connection of the main motors is unmade by the upper part 40 of the controller 39; the motors A and B are connected in parallel respectively with the motors C and D by the upper part 40 of the controller 39; and the solenoids 20, 21, and 23 are energized, the last either at the same time as or slightly later than the other two, to cause the switches 13, 14, and 16 to be closed to complete the motor circuit and cut out part of the resistance 27. As the controller 39 is moved to positions 8, 9, and 10 the solenoids 24, 25, and 26 are energized to cause the successive operation of the switches 17, 18, and 19 to cut out the remainder of the resistance 27. To stop the motors it is only necessary to move the controller 39 from any position in which it may be to the off position, it being unnecessary when such position is one of the parallel positions for the controller 39 to pass through any of the series positions. In such backward movement from position 10, for instance, the resistance 27 or part of it is cut into circuit, the circuit is broken at the switches 13 and 14 or 13 and 16 according as the switch 16 is open or closed as the controller 39 passes backward beyond position 6, and then the parallel connection of the main motors is unmade by the upper part 40 of the controller 39. Thus the breaking of the circuit always takes place at the switch 13 and the switch 14 or 16, which are preferably provided with blow-out coils 50. The main circuit is never broken at the controller 39, although the latter directly controls the series and parallel connections of the motors.

In the arrangement shown, there is in addition to the combined series-parallel switch and master controller 39 shown in development, a second similar controller 39$^a$, including a master reversing switch 37$^a$. Either the controller 39$^a$, which is shown merely in diagrammatic elevation, or the controller 39 may be used to control the system. Although only two such controllers are shown, any desired number may be provided and any one of them used for controlling the motors. In the cables leading to the main motors A, B, C, and D are fuses 51, 52, 53, and 54. In shunt to each of these fuses is a high resistance of some sort, such as a carbon pencil 55, while in shunt to an adjustable part of this resistance is a telltale light or other device 56. Switches 57 and 58 may be provided for cutting out the various carbon pencils and lights respectively. In case one of the fuses blows, as because of an overload or short-circuit on its associated motor, the short-circuit which the fuse furnishes around the carbon pencil is broken and a small current is thrown through such pencil. A proportionate part of this goes through the light 56, which thus indicates which of the fuses has blown. The lights 56 and switches 57 and 58 are preferably arranged in the motorman's cab so that they will give him immediate notice of the blowing of any of the fuses.

Although four motors are here shown arranged to be connected in parallel series and in full parallel by the part 40 of the controller 39, any other desired number of motors may be used and the motors may be connected in other inter-relations than in those mentioned. For instance, by omitting the lower half of such part 40, the system is suitable without other change for the series-parallel control of the motors A and C. Instead of the single motors A, B, C, and D, there may be groups of any desired number of motors. Many other changes in the precise arrangement shown and described may be made without departing from the spirit and scope of my invention, and all such I aim to cover in the following claims.

What I claim as new is:—

1. A motor control system comprising a plurality of motors, a power operated switch at which the motor circuits are always made and broken and a controller for controlling the operation of said switch and for directly varying the inter-relation of said motors.

2. A motor control system comprising a plurality of motors, a controller having several steps for varying the speed of said motors, and a controller for controlling the individual steps of said first mentioned controller and for directly varying the inter-relation of said motors.

3. A motor control system comprising a plurality of motors, a controller for controlling the resistance of the motor circuits step by step and for making and breaking the motor circuit, and a second controller for controlling the individual steps of said first controller and for directly varying the inter-relation of said motors.

4. A motor control system comprising a plurality of motors, an electrically operated controller for making and breaking the motor circuits and varying the resistance thereof in a plurality of independent steps, and a manually operated combined series-parallel switch and master controller.

5. A motor control system comprising a plurality of motors, an electromagnetically operated controller for varying the external resistance in the motor circuits in a plurality of steps, and a manually operated controller for controlling severally the different steps in the operation of said former controller and for directly connecting the motors in series and parallel relation.

6. A motor control system comprising a plurality of motors, a power-operated controller for varying the external resistance in the motor circuit and for making and breaking such circuit, and a manually operated controller for controlling the operation of said power-operated controller and for connecting the motors in various inter-relations, the contacts of the manually operated controller being so arranged that the main circuit is never broken at such controller.

7. A motor control system comprising a plurality of motors, a resistance, a plurality of electromagnetically actuated switches for completing the motor circuit and for varying such resistance, and a master controller for controlling the operation of said electromagnetically actuated switches individually and for directly connecting the motors in different inter-relations.

8. In combination, a plurality of motors, a step-by-step resistance controller and a series-parallel controller therefor, a master controller for controlling the individual steps of the resistance controller, and unitary means for operating the series-parallel controller and the master controller.

9. In combination, a plurality of motors, a remotely controlled resistance controller therefor having a plurality of independent steps, and a manually operated series-parallel controller therefor.

10. In combination, a plurality of motors, a remotely controlled resistance controller therefor having a plurality of independent steps, a manually operated series-parallel controller therefor, and a single handle for controlling both said controllers.

11. In combination, a plurality of motors, and a series-parallel controller therefor, said controller comprising a rotatable drum having an off position between the series and parallel positions, and means for preventing said drum from being moved from the off position to the parallel positions until after it has been moved to the series position.

12. In combination, a plurality of motors, and a series-parallel controller therefor, said controller comprising a rotatable drum having an off position between the series and parallel positions, and means for preventing said drum from being moved from the off position to the parallel positions until after it has been moved to the last series position.

13. In combination, an electric motor, a fuse in the circuit thereof, a comparatively high resistance in shunt to said fuse and normally short-circuited thereby, and an electric light in shunt to part of said high resistance.

14. In combination, an electric motor, a fuse in the circuit thereof, a comparatively high resistance in shunt to said fuse and normally short-circuited thereby, and an electric light in shunt to an adjustable part of said high resistance.

15. In combination, a plurality of motors, a controller for the motors, a fuse in the conductor leading to each motor, and a light associated with each fuse for indicating when such fuse has blown.

16. In combination, a plurality of motors, a controller therefor, a fuse in the conductor leading to each motor, and an electric light connected in shunt to each of said fuses.

17. A motor control system comprising a plurality of motors, a controller for controlling the resistance of the motor circuits and at which the motor circuits are always made and broken, and a second controller for controlling said first controller and for directly varying the inter-relation of the motors.

18. A motor control system comprising a plurality of motors, an electrically operated controller for varying the resistance of the motor circuits and at which said circuits are always made and broken, and a manually operated combined series-parallel switch and master controller.

19. A motor control system comprising a plurality of motors, an electromagnetically operated controller for varying the external resistance in the motor circuits in a plurality of independent steps, and a manually operated controller for controlling the operation of said first mentioned controller and for directly connecting the motors in series and parellel relation.

20. A motor control system comprising a plurality of motors, a resistance, a plurality of electromagnetically actuated switches for varying such resistance, and a master controller for controlling the operation of said electromagnetically actuated switches individually and for directly connecting the motors in different inter-relations.

21. A motor control system comprising a plurality of motors, a resistance, a plurality of electromagnetically actuated switches for varying said resistance and at which the motor circuits are always broken, and a master controller for controlling the operation of said electromagnetically actuated switches and for directly connecting the motors in different inter-relations.

In testimony whereof I affix my signature, in the presence of two witnesses.

EMMETT W. STULL.

Witnesses:
 GEO. B. SCHLEY,
 FRED J. KINSEY.